Aug. 7, 1962  H. WILCKEN  3,047,923
HELICAL THREAD SLIDING CLASP FASTENERS
Filed March 12, 1959  2 Sheets-Sheet 1
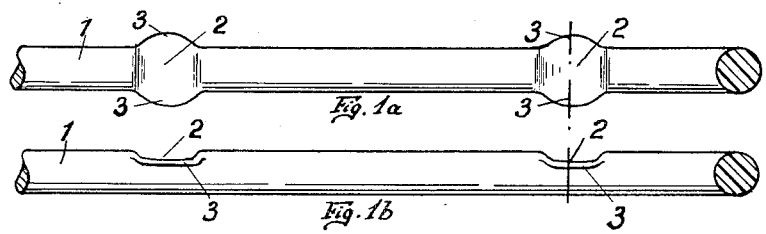
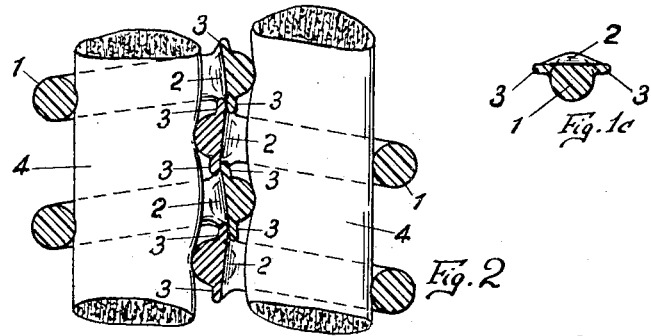
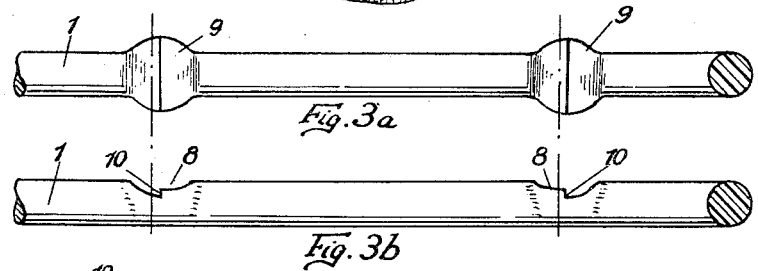
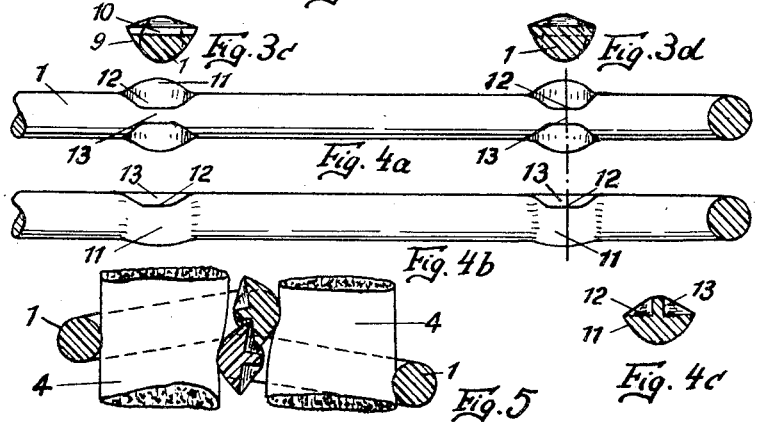
INVENTOR:
HUGO WILCKEN
by
Richardson, David and Verdon
ATTYS.

Aug. 7, 1962  H. WILCKEN  3,047,923
HELICAL THREAD SLIDING CLASP FASTENERS
Filed March 12, 1959  2 Sheets-Sheet 2
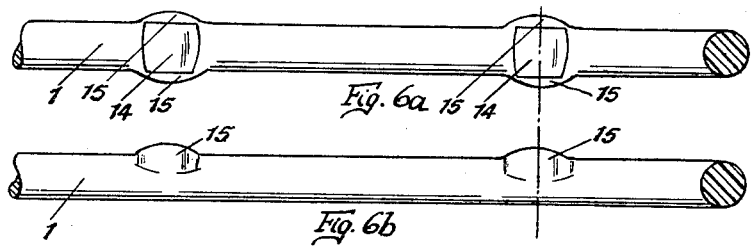
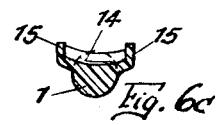
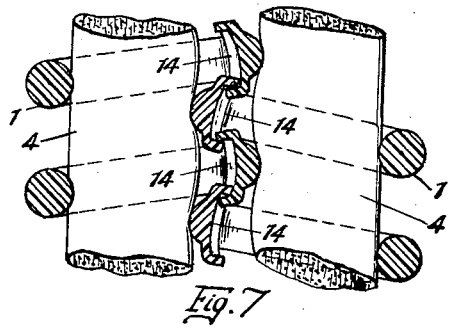
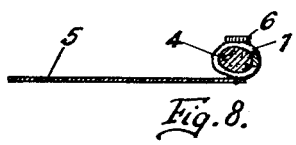
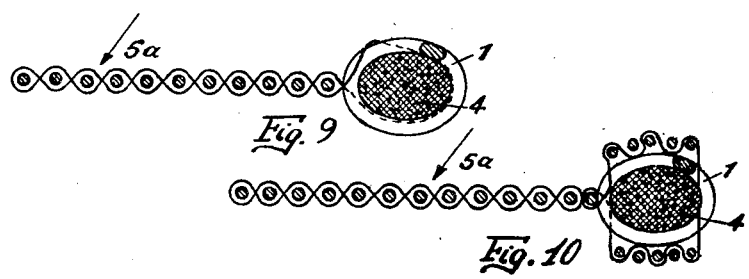
INVENTOR:
HUGO WILCKEN United States Patent Office
3,047,923
Patented Aug. 7, 1962

3,047,923
HELICAL THREAD SLIDING CLASP FASTENERS
Hugo Wilcken, Curau, Kreis Eutin, Holstein, Germany, assignor to Walter Erich Heilmann, Essen-Bredeney, Germany
Filed Mar. 12, 1959, Ser. No. 798,939
Claims priority, application Germany Mar. 12, 1958
12 Claims. (Cl. 24—205.13)

The invention relates to a helical spring sliding clasp fastener whose two fastener strips each include a helically wound plastic thread, the facing coil parts of which are provided with transverse deformations provided on the internal side of the windings, serving as coupling elements, extending in the longitudinal direction of the fastener on both sides beyond the diameter of the thread, and in which a cord passes through each helical spring, it being possible to join the cord to a carrier stringer tape.

It is known to make helical springs for sliding clasp fasteners from a wire or plastic thread, to which the helical spring windings forming the fastener elements are provided, on the internal sides of the oppositely disposed winding parts, with transverse deformations which extend in a longitudinal direction of the helical springs on both sides beyond the wire cross section or thread cross section and which form the coupling elements. Often an insertion or cord is passed through such known helical springs, said insertion or cord serving for weaving the helical springs on to a carrier stringer tape. Since the helical spring when it is used as a warp thread when weaving may move in longitudinal direction, it is not possible in practice to obtain a uniform spacing of windings for the helical springs woven to the carrier stringer tape. Since the cord in the previously mentioned helical springs only takes up a part of the internal cross section of the helical springs, it is not possible to sew this cord and therefore the helical spring to the carrier stringer tape since the cord may effect any displacement in transverse direction in the helical spring, whereby the sewing stitches may be disposed next to the cord. The coupling elements of the two helical springs of the fastener, which are to be made to mesh and being each joined to a carrier stringer tape, may further move in the fastener plane transversely to the longitudinal direction in such a manner that the coupling elements are freely disposed and thereby enable the fastener to be easily opened.

An object of the invention consists in sewing or weaving the cord, surrounded by the helical springs, to a fastener stringer tape and to hold the coupling elements permanently in mutual engagement or in mutually interfitting relationship. This object is attained according to the invention by extending the cord or core extending through the helical springs to fill up the internal helical spring cross section in such a manner that the coupling elements of one helical spring are pressed by the filler cord of the other helical spring flexibly against the rear-gripping coupling elements of the other helical spring, and vice versa. By means of this structure the mutual engagement of the coupling elements is constantly maintained and the possibility of the fastener being split up is reduced. By means of the cord which fills up the helical spring windings completely, the individual windings of the helical springs cannot become displaced relatively to one another in a longitudinal direction and thus a very uniform fastener strip with constant winding spacings is obtained. It is possible to additionally ensure these constant winding spacings by having the core or cord of textile or plastic threads filling up the helical springs glued or cemented to the helical springs on the side remote from the coupling elements.

The safeguard which is obtained according to the invention, in preventing a displacement of the helical spring windings relatively to one another in longiutdinal direction, also enables the helical springs to be used with filler cord directly as warp thread and thereby to weave the helical springs directly to a carrier stringer tape to be manufactured. This weaving of helical spring strips hitherto led to nonuniform winding spacings because there were no means for preserving the spacing of the helical spring windings.

A further object of the invention consists in that the coupling engagement is maintained in helical spring fasteners in which a cord only partially fills the helical springs or is coiled on in longitudinal extension outwardly on the helical springs. When the fastener is bent to any extent, a mutual sliding of the coupling elements in a longitudinal or transverse direction is effectively prevented. This is obtained according to the invention by the fact that the transverse deformation of each winding of the two helical springs consists of an impression, disposed on the inner side, having inwardly-directed projections extending in the longitudinal direction of the fastener on both sides beyond the diameter of the thread, the form of said projections constituting, with the impression, a recess or U-shaped profile in the cross section of the thread. The grooved surfaces or U-shaped legs of these coupling elements of the helical spring windings interengage to a certain extent in hook shape manner by joining two such opposite helical springs by means of a slider, so that the longitudinal displacement of the helical windings is clearly limited, with a spacing becoming larger on bending the fastener. Obviously it is particularly advantageous in this connection to completely fill up the helical spring with a core or cord in such a manner that the hook engagement cannot become detached.

In order that the invention may be more clearly understood, reference will now be made to the accompanying drawings which show certain embodiments thereof by way of example, and in which:

FIGURES 1a, 1b and 1c respectively show enlarged plan and side views and a cross section of a polyamide thread or the like provided with transverse deformations for making a helically-wound sliding clasp fastener.

FIGURE 2 shows in longitudinal section parts of two interlocking helical threads with a filler cord in which the thread according to FIGURE 1 is employed.

FIGURES 3a, 3b, 3c and 3d respectively show plan and side views and two cross sections modified form of polyamide thread provided with transverse deformations.

FIGURES 4a, 4b, 4c respectively show plan and side views and a cross section of a third embodiment of a polyamide thread.

FIGURE 5 shows a median longitudinal section through two pitches of a helically wound polyamide thread according to FIGURE 4, with a filler cord.

FIGURES 6a, 6b and 6c respectively show plan and side views and a cross section of a fourth embodiment of the polyamide thread.

FIGURE 7 shows a median longitudinal section through several pitches of a helically wound polyamide thread according to FIGURE 6 having filler cords.

FIGURE 8 shows a cross section through a fastener strip according to the invention.

FIGURES 9 and 10 show two schematic very enlarged cross sections through fastener strips whose helical threads and cords are woven to a stringer tape by means of a warp thread.

According to the invention and to the individual specific embodiments one starts for example with a polyamide thread or the like having a circular, oval, or like cross section. For reasons of simplification of the drawing the thread is shown with a circular cross section and this thread 1 is provided according to FIGURE 1 with transverse deformations at distances, in accordance with the desired pitch of the helical thread to be manufactured, said transverse deformations forming the coupling elements of two oppositely wound helical threads. These transverse deformations consist according to FIGURE 1 of impressions 2, through which are formed projections 3 projecting beyond the cross-section of the thread and disposed on either side of each thread or of each helical pitch in longitudinal direction of the strips. This thread is helically wound about a core which is perferably constituted of material which can be sewn, for example a filler cord 4, in such a manner that the transverse deformations 2, 3 of each helical thread will be disposed along a line. If necessary it is also possible to wind the two helical threads of a fastener with the same pitch. The polyamide threads 1 helically wound on the filler cord 4 are sewn to a fastener stringer tape, the stitches being disposed in longitudinal direction between the pitches and running through the filler cord 4 as shown in FIGURE 8 for example, in which the helical pitches of the thread 1 are sewn to one side of a fastener stringer tape 5. Additionally on the side of the helical threads remote from the fastener stringer tape 5, a narrow textile strip 6 may be applied and also jointly sewn on.

By employing cords, or fillings serving as cores, which fill completely or at least nearly completely the helical threads, it is possible to weave the filler cord 4 with the helical thread to a stringer tape by means of a warp thread, the weft threads being applied between the helical pitches against the filler cord. In the case of FIGURE 9 the filler cord 4, having the wound on helical thread 1, is woven to a textile stringer tape 5a by means of a warp thread at the edge, the weft thread being disposed between the helical thread pitches, owing to the fact that it slides off from the rounded thread 1 but crosses the polyamide thread 1 once with each reciprocating weft. Owing to the fact that this crossing position becomes displaced under certain circumstances relatively to the stringer tape side part of the polyamide thread which is remote from the coupling parts, the fastener slider would impose a great strain on the weft thread which crosses here and might possibly destroy it by abrasion and then would cause the filler cord with the helical thread to become detached from the stringer tape.

In order to avoid this defect, as shown in the schematic view of FIGURE 10, the filler cord 4 with the polyamide thread 1 wound on is covered above and below by threads which are bound by means of the weft thread by a suitable shedding in such a manner that coupling side and also the opposite side of the polyamide thread remains free on either side of the stringer tape 5a, i.e. here the weft threads between the helical pitches become disposed firmly between the filler cord 4. In this manner a completely symmetrical sliding clasp fastener having a good light slider guide is obtained and furthermore the side flanges of a symmetrical slider lie against the wear-resistant polyamide thread and are guided thereon, that is to say, a chafing through of weft threads is avoided. This type of weaving in which the filler cord is firmly bound with polyamide threads by a core of a closed weave has the advantage that the polyamide thread is covered and thereby is basically protected against ironing heat and does not need to be dyed to match the colour of the stringer tape 5a and the covering weave parts 6. The main point to be stressed is that additional sewing machines for joining the filler cord and the helical thread to a fastener stringer tape are completely unnecessary.

By means of the filler cord 4 the coupling elements of two fastener strips, which are brought into engagement by means of a slider or the like, are firmly pressed against one another, from the inside towards the outside and thus the necessary safeguard against the fastener splitting up is obtained, since it is no longer possible for the individual helical thread windings of the two threads to move relatively to one another in the plane of the fastener. Moreover, a transverse movement is prevented by the fact that the projections 3 are made by the impressions 2 on one side of the thread, in such a manner that the limiting surfaces, disposed in longitudinal direction of the impression, prevent a displacement of the coupling parts perpendicularly to the plane of the fastener.

This safeguard against displacement perpendicularly to the plane of the fastener may be enhanced if the transverse deformation of the thread according to FIGURE 3 consists of an impression 8 disposed at one side of the inner side of each helical pitch. The impression provides the helical thread in transverse direction with flattenings 9 on either side, which project beyond the periphery of the thread 1. Each impression is alternately provided, in the longitudinal direction of the thread or in the direction of coiling, with a step 10 disposed in one direction or the other. If from this thread according to FIGURE 3 a helical thread is coiled on each of two filler cords, as described with reference to FIGURES 1 and 2, then the two opposite helical threads must be brought into opposite engagement, staggered by one pitch. The step of these two helical threads prevents the coupling parts 8 and 9 from becoming displaced transversely, normally to the plane of the fastener.

In order to ensure that the transverse deformation weakens the polyamide thread 1 as little as possible in cross section, this transverse deformation according to the specific embodiment of FIGURE 1 is made of two lateral impressions 12 disposed on the internal side of each helical pitch to be manufactured. The impression provides the thread in transverse direction with projecting flattenings 11, and there remains between the impressions 12 a flange 13 disposed in the direction of the thread. The impressions 12 with the flattenings 11 form the coupling elements, as can be seen from FIGURE 5, and in this case also the helical threads produced from the thread, according to FIGURE 4, are filled with a cord 4.

If a particularly good safeguard against splitting is to be ensured, then the thread is provided with transverse deformations according to FIGURE 6. According to this specific embodiment the transverse deformations consist of an impression 14. The material displaced by the impression produces a widening on both sides beyond the periphery of the thread in such a manner that these widenings have lateral limiting edges 15 and the impression 14 has a U-shaped transverse profile of the thread as may be seen in FIGURE 6c. If this thread is coiled helically on a filler cord 4 according to FIGURE 7, and the coupling elements 14, 15 are disposed in a line, then the lateral projecting U-shaped legs 15 of two such helical threads provided with filler cords interlock in hook fashion and thus the fastener cannot split either in the plane of the fastener or perpendicularly thereto, owing to the fact that the coupling parts are held pressed into one another in a flexible manner by the filler cord.

It is possible according to the invention to start with a non-circular polyamide thread 1 and it is possible to give to the helical pitches of the thread and also to the filler cord a profile cross-section which is circular, elliptical, rounded, rectangular or other shape. It is also possible to join the helically wound thread permanently to the filler cord 4 on a part of the contour of the individual helical pitches for example by means of a glue or a glueing compound. The parts of the helical turns which have the coupling elements remain free in order thereby to obtain a particularly firm mutual position of the turns on the filler cord 4.

When the polyamide thread has been helically wound on the filler cord, the filler cord can be sewn with the helical threads to a fastener stringer tape 5 or 7 as shown in FIGURE 8. It is also possible to weave the filler cord with the wound-on helical thread to a stringer tape by means of a warp thread, as is shown in FIGURES 9 and 10.

I claim:
1. A slide fastener structure, comprising a pair of fastener members each formed by a helically wound continuous thread of plastic material; coupling means on each convolution of each of said fastener members formed by integral transverse deformations inside of the convolution and extending laterally beyond both sides of the thread axially of the member; a first filler cord extending axially through one fastener member; a second filler cord extending axially through the other fastener member, the filler cords being made of longitudinally inextensible transversely deformable material, the filler cords being enveloped firmly by the convolutions of the respective fastener members with the deformations thereof facing the respective cords; the deformations of the convolutions of the one member engaging with the deformations of the convolutions of the other member inside of the convolutions of both members when the members are engaged with each other; the first filler cord being then compressed by outer portions of the convolutions of the other fastener member opposite the deformations thereat; the second filler cord being then compressed by outer portions of the convolutions of the one fastener member opposite the deformations thereat; the compressed cords preventing axial and transverse displacements of the convolutions of the engaged fastener members.

2. A slide fastener structure according to claim 1, further comprising a carrier stringer tape for each fastener member, and means securing each fastener member to a different carrier stringer tape.

3. A slide fastener structure according to claim 2, further comprising a narrow tape overlaying each of the fastener members with each carrier stringer tape underlaying a fastener member diametrally opposite the narrow tape thereon, said means being sewed connections with sewing thread extending diametrally through each cord connecting the narrow and stringer tapes to the cord, the outer portions and deformations of each of the convolutions of each fastener member being exposed between the narrow tape and stringer tape.

4. A slide fastener structure according to claim 3, wherein said means further comprises glued connections between the fastener members and the filler cords, the glued connections extending around part of the circumference of each convolution with the exception of the deformations thereof.

5. A slide fastener structure according to claim 2, wherein said means comprises woven connections between the filler cords and the carrier stringer tapes, the filler cords and the fastener members defining edge warp threads wrapped by weft threads of the carrier stringer tapes, the weft threads being disposed between the convolutions of the fastener members engaging the filler cords in the fastener members.

6. A slide fastener structure according to claim 2, wherein said means comprises glued connections between the fastener members and the filler cords extending around part of the circumference of each convolution with the exception of the deformations thereof, and woven connections between the filler cords and the carrier stringer tapes, the filler cords and the fastener members defining edge warp threads wrapped by weft threads of the carrier stringer tapes, the weft threads being disposed between the convolutions of the fastener members engaging the filler cords in the fastener members.

7. A slide fastener structure according to claim 2, wherein said means comprises woven connections securing each of the fastener members and filler cords to a carrier stringer tape, the woven connections being formed by warp threads of the carrier stringer tapes covering upper and lower portions of the fastener members in planes substantially parallel to the carrier stringer tapes, the warp threads and the fastener members being bound by weft threads, thereby forming upper and lower shedding and leaving exposed the sides of the convolutions having deformations and the sides of the convolutions diametrally opposite the deformations, the weft threads firmly engaging both sides of each filler cord between the convolutions in each fastener member.

8. A slide fastener structure according to claim 2, wherein said means comprises a glued connection between the fastener members and the filler cords extending around part of the circumference of each convolution with the exception of the deformations thereof, and a woven connection securing each of the fastener members with each of the filler cords to a carrier stringer tape, the woven connection being formed by warp threads of the carrier stringer tape covering upper and lower portions of each fastener member in planes substantially parallel to the carrier stringer tape, the warp threads and the fastener member being bound by weft threads thereby forming upper and lower shedding leaving the deformed portions and diametrally opposite portions of the convolutions exposed, the weft threads firmly engaging both sides of the filler cord between the convolutions of each fastener member.

9. A slide fastener structure according to claim 1, wherein the deformations of the convolutions are formed by flattened impressions of the material of the thread.

10. A slide fastener structure according to claim 1, wherein the deformations of the convolutions are formed by flattened impressions of the material of the thread, said impressions having cup-like recesses with edges of the recesses shaped to hook-like form for interengaging each other when the fastener members are joined, thereby preventing separation of the fastener members in axial planes of the fasteners and in transverse planes thereof.

11. A slide fastener structure according to claim 1, wherein the deformations of the convolutions are formed by flattened impressions of the material of the thread, the impressions defining ears on opposite sides of the thread, each impression having a transversely extending step alternately facing in opposite longitudinal directions of the thread.

12. A slide fastener structure according to claim 1, wherein the deformations of the convolutions are formed by flattened impressions of the material of the thread, the impressions being formed in pairs, each pair defining ears extending laterally outward of a median radially extending web.

References Cited in the file of this patent

UNITED STATES PATENTS

| | | |
|---|---|---|
| 1,846,919 | Sundback | Feb. 23, 1932 |
| 2,346,024 | Goldner | Apr. 4, 1944 |
| 2,393,058 | Pierce | Jan. 15, 1946 |
| 2,541,728 | Wahl | Feb. 13, 1951 |
| 2,643,432 | English | June 30, 1953 |

FOREIGN PATENTS

| | | |
|---|---|---|
| 314,329 | Great Britain | May 15, 1929 |